D. DALZELL.
AXLE-BOX.

No. 189,434. Patented April 10, 1877.

WITNESSES
Nat. E. Oliphant
D. P. Earl

INVENTOR
David Dalzell,
per Chas. H. Fowler
Attorney.

UNITED STATES PATENT OFFICE.

DAVID DALZELL, OF SOUTH EGREMONT, MASSACHUSETTS.

IMPROVEMENT IN AXLE-BOXES.

Specification forming part of Letters Patent No. 189,434, dated April 10, 1877; application filed June 29, 1876.

*To all whom it may concern:*

Be it known that I, DAVID DALZELL, of South Egremont, in the county of Berkshire and State of Massachusetts, have invented a new and valuable Improvement in the Manufacture of Axle-Boxes; and I do hereby declare that the following is a full, clear, and exact description of the construction and operation of the same, reference being had to the annexed drawings, making a part of this specification, and to the letters and figures of reference marked thereon.

Figure 1:
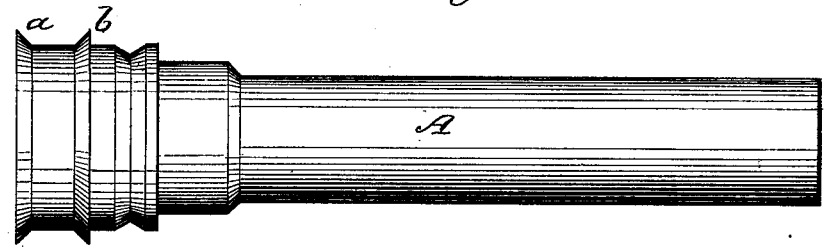
Figure 2:
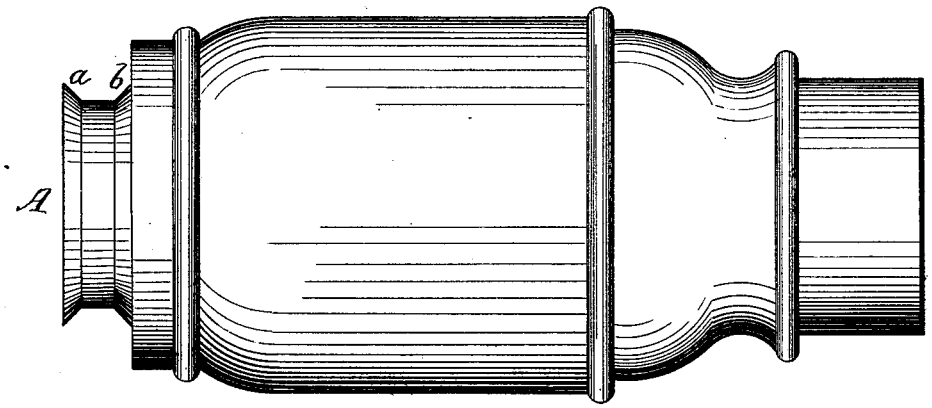

Figure 1 is a side elevation of my improved axle-box, and Fig. 2 a view showing it connected to the hub of a vehicle.

This invention has relation to axle-boxes; and it consists in providing the head of an axle-box with an annular bead or shoulder formed upon the outer end thereof, the object of which being to form or make a conductor for the oil which escapes from the axle, and prevent the oil from running on the hub and soiling the wheel by dropping it on the ground.

My invention also consists, in connection with such a bead or shoulder, of a shoulder similar in form, for the purpose of presenting to the end of the hub a bearing; also for protecting it from water or other substances.

The axle-box A has formed upon the head or end thereof an annular bead or shoulder, *a*. The head of the box for this purpose is made somewhat longer, to project from the end of the hub, as may be seen by reference to Fig. 2.

The bead or shoulder *a* serves or acts as a conductor for the oil which escapes from the axle, and instead of allowing the oil to run on the hub and spokes, and thereby soiling the wheel and injuring the paint and varnish, it is caused to drop off on the ground by the bead or shoulder *a*, thus keeping the wheel clean; also, the wheel in finish and appearance is much improved.

In addition to the bead or shoulder *a*, a shoulder, *b*, may be formed upon the head of the box for the purpose of bearing against the end of the hub to protect it from water or other substances; also, to form a bearing for the same.

Having now fully described my invention, what I claim as new, and desire to secure by Letters Patent, is—

1. An axle-box, having formed upon its head an annular shoulder or bead for conducting off the oil from the hub or wheel, substantially as and for the purpose specified.

2. In combination with an annular shoulder or bead, formed upon the head of an axle-box for conducting off the oil from the wheel or hub, a supplemental shoulder upon the head to form a bearing for the hub and protect it from the water or other substances, substantially as and for the purpose described.

In testimony that I claim the above I have hereunto subscribed my name in the presence of two witnesses.

DAVID DALZELL.

Witnesses:
GEO. R. PORTER,
NAT. E. OLIPHANT.